(12) United States Patent
LaValley et al.

(10) Patent No.: US 11,656,020 B2
(45) Date of Patent: May 23, 2023

(54) CLIMATE-CONTROLLED CONTAINER SYSTEM

(71) Applicant: TAKEOFF TECHNOLOGIES, INC., Waltham, MA (US)

(72) Inventors: Zachery LaValley, Arlington, MA (US); Alfredo Millan, Lexington, MA (US); Curt Avallone, Scituate, MA (US)

(73) Assignee: TAKEOFF TECHNOLOGIES, INC., Waltham, MA (US)

( * ) Notice: Subject to any disclaimer, the term of this patent is extended or adjusted under 35 U.S.C. 154(b) by 131 days.

(21) Appl. No.: 17/031,000

(22) Filed: Sep. 24, 2020

(65) Prior Publication Data

US 2022/0026139 A1    Jan. 27, 2022

Related U.S. Application Data

(60) Provisional application No. 63/056,234, filed on Jul. 24, 2020.

(51) Int. Cl.
| | | |
|---|---|---|
| *F25D 19/00* | (2006.01) | |
| *F25D 11/00* | (2006.01) | |
| *F25D 29/00* | (2006.01) | |
| *F25D 25/02* | (2006.01) | |
| *B65G 1/06* | (2006.01) | |

(52) U.S. Cl.
CPC ............ *F25D 19/003* (2013.01); *B65G 1/065* (2013.01); *F25D 11/003* (2013.01); *F25D 25/02* (2013.01); *F25D 29/003* (2013.01); *F25D 2700/02* (2013.01)

(58) Field of Classification Search
CPC ...... F25D 19/003; F25D 11/003; F25D 25/02; F25D 29/003; F25D 2700/02; B65G 1/065
See application file for complete search history.

(56) References Cited

U.S. PATENT DOCUMENTS

| | | | |
|---|---|---|---|
| 8,061,149 B1 * | 11/2011 | Gowans | A61J 1/165 |
| | | | 62/3.62 |
| 9,008,827 B1 | 4/2015 | Dwarakanath et al. | |
| 10,585,838 B2 * | 3/2020 | Dantin | G06F 13/20 |

(Continued)

FOREIGN PATENT DOCUMENTS

WO    2019/028142 A1    2/2019

OTHER PUBLICATIONS

Search Report in corresponding United Kingdom Patent Application No. GB2110641.4 dated Apr. 11, 2022.

*Primary Examiner* — David J Teitelbaum
(74) *Attorney, Agent, or Firm* — Lando & Anastasi, LLP (57) ABSTRACT

In various examples of the disclosure, a climate-controlled container configured to be transported by a robot is provided, the climate-controlled container comprising a plurality of walls defining a compartment to store goods, a lid configured to seal the compartment, at least one climate-control unit configured to control a climate inside the compartment, a controller configured to control the at least one climate-control unit to maintain a temperature of the compartment within a range of temperature values, and a power interface configured to receive electrical power from at least one shelving unit to which the climate-controlled container is coupled.

14 Claims, 8 Drawing Sheets

(56) References Cited

U.S. PATENT DOCUMENTS

| | | | |
|---|---|---|---|
| 2005/0132718 A1* | 6/2005 | Lilke | F25D 11/02 |
| | | | 62/3.6 |
| 2016/0286998 A1* | 10/2016 | Lindbo | F25D 17/06 |
| 2017/0261237 A1* | 9/2017 | High | F25B 9/04 |
| 2020/0071076 A1 | 3/2020 | Fosnight et al. | |

\* cited by examiner

CLIMATE-CONTROLLED CONTAINER SYSTEM

CROSS-REFERENCE TO RELATED APPLICATIONS

This application claims priority under 35 U.S.C. § 119(e) to U.S. Provisional Application Ser. No. 63/056,234, titled "TEMPERATURE-CONTROLLED CONTAINER SYSTEM," filed on Jul. 24, 2020, which is hereby incorporated by reference in its entirety.

BACKGROUND

1. Field of the Disclosure

At least one example in accordance with the present disclosure relates generally to climate-controlled container systems.

2. Discussion of Related Art

Prior to reaching customers, goods are often stored in locations such as warehouses, fulfillment centers, and so forth. Goods may be stored in containers, also referred to as "totes," which may be placed on shelving for subsequent retrieval. Certain goods may require certain ambient environmental conditions. For example, certain goods may need to be refrigerated below a certain temperature. Totes containing such goods may be placed in an ambient environment that meets these requirements. For example, totes containing goods that should be refrigerated may be placed in a humidity- and/or temperature-controlled room to maintain ambient conditions at an appropriate level.

SUMMARY

According to at least one aspect of the present disclosure a climate-controlled container configured to be transported by a robot is provided, the climate-controlled container comprising a plurality of walls defining a compartment to store goods, a lid configured to seal the compartment, at least one climate-control unit configured to control a climate inside the compartment, a controller configured to control the at least one climate-control unit to maintain a temperature of the compartment within a range of temperature values, and a power interface configured to receive electrical power from at least one shelving unit to which the climate-controlled container is coupled.

In some examples, the climate-controlled container includes a communication interface communicatively coupled to the controller. In at least one example, the controller is further configured to receive, from an external computing device via the communication interface, instructions to maintain the temperature of the compartment within the range of temperature values. In various examples, the controller is further configured to send, to an external computing device via the communication interface, information indicative of operating conditions of the climate-controlled container. In at least one example, the information indicative of the operating conditions includes temperature information indicative of at least one of the temperature or humidity of the compartment. In some examples, the information indicative of the operating conditions includes information indicative of a location of the climate-controlled container. In various examples, the information indicative of the operating conditions includes information indicative of whether the lid is opened or closed.

In at least one example, the power interface includes a plurality of electrical contacts on a bottom portion of the climate-controlled container, the plurality of electrical contacts being configured to be electrically coupled to a power source external to the climate-controlled container. In some examples, the bottom portion of the climate-controlled container is configured to be placed on a shelving unit including a powered rail, and wherein at least one electrical contact of the plurality of electrical contacts is configured to receive power from the powered rail. In various examples, the bottom portion of the climate-controlled container is configured to be placed on a transportation robot, and wherein at least one electrical contact of the plurality of electrical contacts is configured to receive power from the transportation robot.

In at least one example, the plurality of electrical contacts is a first plurality of electrical contacts, and wherein the climate-controlled container further comprises a second plurality of electrical contacts electrically coupled to the first plurality of electrical contacts. In some examples, the climate-controlled container is a first climate-controlled container, and wherein the first climate-controlled container is configured to be placed in contact with a second climate-controlled container, wherein the first plurality of electrical contacts is configured to be electrically coupled to the second climate-controlled container, and wherein the first climate-controlled container is configured to receive, via the first plurality of electrical contacts, power from the second climate-controlled container. In various examples, the first climate-controlled container is configured to be in contact with a third climate-controlled container, wherein the second plurality of electrical contacts is configured to be electrically coupled to the third climate-controlled container, and wherein the first climate-controlled container is configured to provide, via the second plurality of electrical contacts, power to the third climate-controlled container.

In at least one example, the compartment is a first compartment, and wherein the climate-controlled container includes a second compartment to store goods, the second compartment being separated from the first compartment by a wall. In some examples, the controller is configured to control the at least one climate-control unit to maintain the first compartment within a first range of temperature values and to maintain the second compartment within a second range of temperature values, the first range of temperature values being different than the second range of temperature values.

According to various examples of the disclosure, a method of fulfilling an order is provided, the method comprising receiving an order for one or more goods, determining one or more climate-controlled containers containing the one or more goods, providing electrical power to the one or more climate-controlled containers via at least one power interface of the one or more climate-controlled containers from at least one shelving unit to which the one or more climate-controlled containers are coupled, retrieving the one or more climate-controlled containers, and extracting the one or more goods from the one or more climate-controlled containers.

In at least one example, retrieving the one or more climate-controlled containers includes retrieving, by at least one transportation robot, the one or more climate-controlled containers, and delivering, by the at least one transportation robot, the one or more climate-controlled containers to a picking region. In some examples, providing the electrical power to the one or more climate-controlled containers includes providing, by the at least one transportation robot, the electrical power to the one or more climate-controlled containers via the at least one power interface. In various examples, the at least one shelving unit includes at least one electrified rail, and wherein providing the electrical power to the one or more climate-controlled containers includes providing, by the at least one shelving unit, the electrical power to the one or more climate-controlled containers via the at least one electrified rail.

According to various examples of the disclosure, a climate-controlled container system is provided comprising a compartment to store goods, a lid configured to seal the compartment, at least one coupling element configured to enable a transportation robot to retrieve the climate-controlled container, and means for receiving electrical power from at least one shelving unit and controlling a climate inside of the compartment to maintain a temperature of the compartment within a range of temperature values using the electrical power.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As discussed above, goods are often stored in centralized store locations prior to reaching consumers. For example, goods may be stored in distribution warehouses, fulfillment centers, retail store stock rooms (collectively, "storage locations"), and so forth. Goods are often stored in containers, also referred to as "totes," which may be placed in storage (for example, on shelves) for subsequent retrieval. Retrieval may be performed manually by a person, optionally with the assistance of tools or machinery such as forklifts, or may be performed automatically by a robot. For example, a tote-retrieval robot may retrieve a designated tote from storage and bring the tote to a person (or "picker") to extract goods from the tote and fulfill one or more orders.

Certain goods may require, or derive advantages from, certain ranges of climate conditions. Climate conditions may include any properties of an ambient environment, such as temperature and humidity. Different kinds of goods may benefit from different climate conditions. For example, ice cream may benefit from being stored in an environment having a temperature well below a freezing point. Conversely, goods such as carbonated beverages may not benefit from being stored at below-freezing temperatures, because bottles or cans containing the beverages may rupture if the beverage freezes and expands.

To address the foregoing concerns, some existing storage locations are divided into two or more climate regions. Each climate region has certain climate conditions, such as a specified humidity and/or temperature or acceptable ranges thereof, and goods may be matched with climate conditions that the goods are to be preferably stored at. For example, one climate region may have an ambient temperature of no greater than 32 degrees Fahrenheit. Goods that are intended to remain frozen may be stored in this climate region.

In certain existing storage locations, such a climate region may include an isolated, climate-controlled room in which containers are placed. The room may include air-conditioning units configured to cool the room and maintain a certain humidity in the room such that goods in totes stored in the room do not exceed a certain temperature above which the goods may degrade. Humans and/or robots may enter the room to retrieve the totes to fulfill one or more orders.

Figure 1:
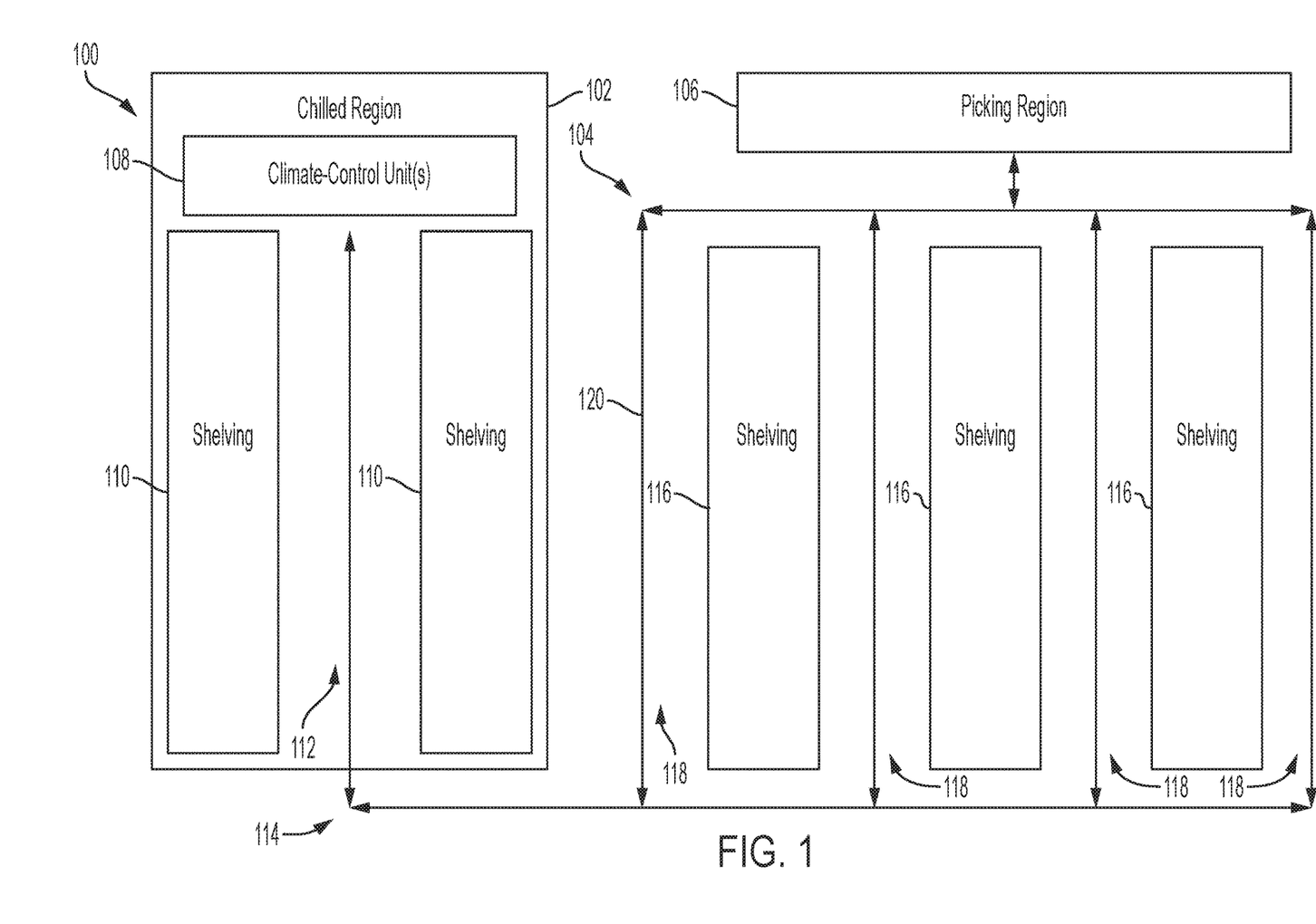
FIG. 1 illustrates a schematic diagram of a storage location according to an example.

To illustrate the foregoing in greater detail, FIG. 1 illustrates a schematic diagram of a storage location 100 according to an example. The storage location 100 may include any area in which goods are stored, such as a warehouse, a fulfillment center, a stock room of a retail location, a distribution center, and so forth. The storage location 100 includes a chilled region 102, an ambient region 104, and a picking region 106. The chilled region 102 includes one or more climate-control units 108, shelving 110, an aisle 112 between the shelving 110, and a point of ingress and egress 114. The ambient region 104 includes shelving 116 and aisles 118 between and around the shelving 116. It is to be appreciated that the particular size and arrangement of the regions 102-106 is for purposes of example only, and that alternate sizes, arrangements, and proportions of the regions 102-106 are within the scope of the disclosure.

The storage location 100 may be traversable along paths 120 throughout the storage location 100. For example, the paths 120 may be traversable by humans, robots, or a combination of both (including, for example, humans operating machinery). Although the paths 120 are designated with double-ended arrows, in some examples, the paths 120 may be divided into one-way paths. Similarly, although the chilled region 102 is illustrated with the single point of ingress and egress 114, in some examples, the chilled region 102 may include a point of ingress and a separate point of egress.

As indicated above, goods may be stored in containers which are, in turn, stored on the shelving 110 or 116. Goods that are intended to be stored in refrigerated environments may be stored in containers that are stored on the shelving 110 in the chilled region 102. The one or more climate-control units 108 may chill the chilled region 102 to a desired temperature, and/or may control the humidity in the chilled region 102 to have a desirable humidity. Conversely, goods that do not need to be stored in refrigerated environments may be stored in containers that are stored on the shelving 116 in the ambient region 104. The ambient region 104 may not have climate-control units. In other examples, the ambient region 104 may include climate-control units configured to maintain an environment in the ambient region 104 to be comfortable for human workers and/or to have desirable conditions for robots and/or machinery, rather than controlling the environment based on requirements of goods stored therein. In still other examples, the ambient region 104 may include climate-control units configured to maintain an environment in the ambient region 104 based on requirements of goods stored therein, but the goods may have looser requirements than those in the chilled region 102, such as by not requiring that the ambient region 104 be below a freezing point.

Goods stored in the storage location 100 may be subsequently retrieved to fulfill demand for the goods. For example, an order for goods stored in the storage location 100 may be received by an owner or bailee of the goods. The goods specified in the order may be subsequently retrieved by determining which container(s) the goods are stored in, retrieving the container(s), and bringing them to the picking region 106. At the picking region 106, goods corresponding to the order may be picked from the containers and prepared for delivery to a customer. For example, the goods may be picked and placed in another container, which may be delivered to a customer.

The configuration employed by the storage location 100 as discussed in the foregoing example may be disadvantageous. For example, providing a chilled region 102 separate from the ambient region 104 may limit a flexibility of the storage location 100. The chilled region 102 must be constructed in advance, such as by erecting insulated walls and installing the climate-control units 108. The chilled region 102 cannot easily be expanded or contracted in size, and space in the chilled region 102 may be wasted or insufficient if the number of goods that must be stored in the chilled region 102 is not equal to the capacity of the chilled region 102 to store goods. This lack of flexibility may be disadvantageous, especially if a demand for goods having certain climate conditions—and, consequently, a need for storage space that can provide those climate conditions—fluctuates over time, leading to under-utilization of the chilled region 102 when demand drops and an inability to store enough goods if demand increases. Furthermore, a power consumption of the climate-control units 108 may be relatively static regardless of how many goods are stored in the chilled region 102, which may waste energy.

In addition, condensation may accumulate on containers removed from the chilled region 102, which may lead to various disadvantages including an inability for identifiers or information on the containers from being read or understood by humans and/or machines. Human operators entering the chilled region 102 may also experience physical discomfort when standing in the chilled region 102, and machinery is often subject to strict design requirements to withstand the low temperatures of the chilled region 102. Accordingly, employing the chilled region 102 may lead to several disadvantages.

Examples provided herein include climate-controlled containers capable of storing goods therein. The climate-controlled containers may be configured to control an ambient temperature and/or humidity inside of the container. The temperature and/or humidity may be variable, and may support refrigeration above and below a freezing point. Each container may include one or more compartments, each of which may have a separately controllable climate. The containers may include insulated walls, including an insulated lid capable of being opened and closed manually, automatically, or a combination of both. The containers may include energy storage devices, such as batteries, or may receive power only from external sources. The containers may include outlets for receiving power and/or electrically conductive contacts to be placed in electrical connection with a power source, which may include power distribution rails coupled to a support, such as shelving, on which the containers are stored or placed. The containers may include one or more power output connections to provide electrical power from the power source to one or more other containers, which may be positioned near the container. Accordingly, examples provided herein yield increased flexibility and reduced cost of storage locations and storage generally, while increasing worker comfort and relaxing design requirements for container-retrieval robots.

Figure 2:
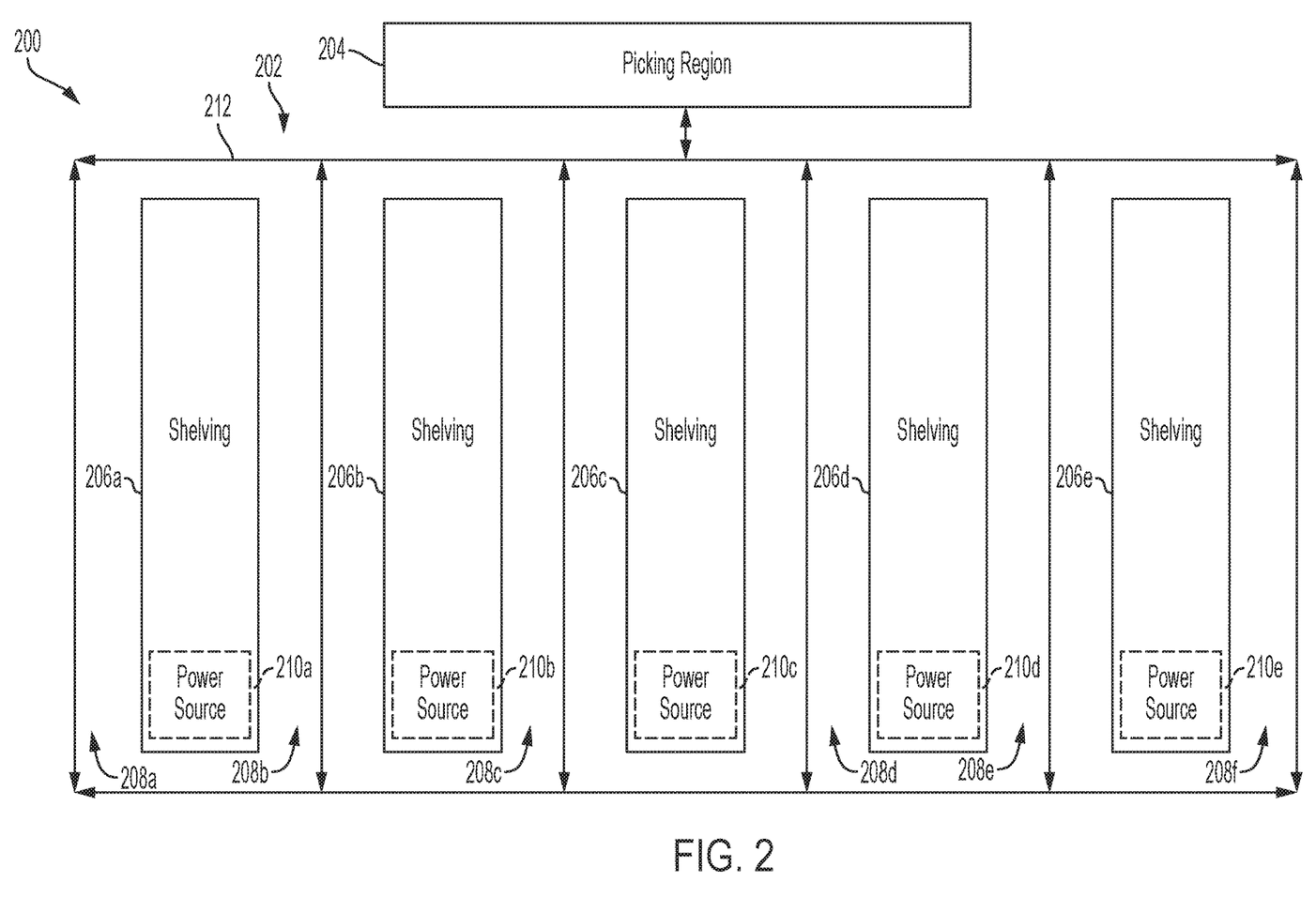
FIG. 2 illustrates a schematic diagram of a storage location according to another example.

FIG. 2 illustrates a storage location 200 according to another example. The storage location 200 may include any area in which goods are stored, such as a warehouse, a fulfillment center, a stock room of a retail location, a distribution center, and so forth. The storage location 200 includes a storage region 202 and a picking region 204. The storage region 202 includes a first shelving unit 206a, a second shelving unit 206b, a third shelving unit 206c, a fourth shelving unit 206d, and a fifth shelving unit 206e (collectively, "shelving units 206"), and a first aisle 208a on a first side of the first shelving unit 206a, a second aisle 208b between a second side of the first shelving unit 206a and a first side of the second shelving unit 206b, a third aisle 208c between a second side of the second shelving unit 206b and a first side of the third shelving unit 206c, a fourth aisle 208d between a second side of the third shelving unit 206c and a first side of the fourth shelving unit 206d, a fifth aisle 208e between a second side of the fourth shelving unit 206d and a first side of the fifth shelving unit 206e, and a sixth aisle 208f on a second side of the fifth shelving unit 206e (collectively, "aisles 208").

In some examples, the first shelving unit 206a optionally includes a first power source 210a, the second shelving unit 206b optionally includes a second power source 210b, the third shelving unit 206c optionally includes a third power source 210c, the fourth shelving unit 206d optionally includes a fourth power source 210d, and/or the fifth shelving unit 206e optionally includes a fifth power source 210e. The storage location 200 is traversable (for example, by human workers, robots, machinery, or any combination thereof) via paths 212, which may be unidirectional, bidirectional, or a combination of both.

Each of the shelving units 206 may include one or more shelves to store goods. In some examples, the goods may be stored in containers. The containers may be placed on the shelves for storage and/or subsequent retrieval. As discussed in greater detail below, some containers may be climate controlled. For example, a climate-controlled container may control a climate within the container to have an environment desirable for certain goods to be stored in the climate-controlled container. Other containers may not be climate controlled, such as containers storing goods that may reasonably be stored at typical room temperatures. Non-climate-controlled containers may be referred to herein as "ambient containers." In various examples, the shelving units 206 are capable of storing any combination of climate-controlled containers and ambient containers in any configuration. That is, climate-controlled containers can be placed in the storage location 202, even though the storage location 202 itself may not have an environment meeting the requirements of goods stored in the containers, at least because the containers themselves are climate controlled. The storage location 202 is thus highly flexible at least because a wide range of goods may be stored in any combination without limitation by the goods' climate requirements.

The climate-controlled containers may receive electrical power from the power sources 210. The power sources 210 may include, for example, a mains utility connection, a generator, an uninterruptible power supply, or any other source of electrical power. In some examples, the storage location 200 may include a single mains utility input that distributes power to each of the shelving units 206, or may include multiple mains utility inputs that each distribute power to a subset of the shelving units 206.

Power from the power sources 210 may be distributed to containers stored in a corresponding one of the shelving units 206. For example, a climate-controlled container stored in the first shelving unit 206a may receive power from the first power source 210a. In some examples, the first power source 210a may provide power to electrified rails on which containers are placed in the first shelving unit 206a. The climate-controlled container may use the power received via the electrified rails to power a climate-control unit, such as an air conditioning unit, to maintain an appropriate temperature and/or humidity inside of the climate-controlled container.

Figure 3:
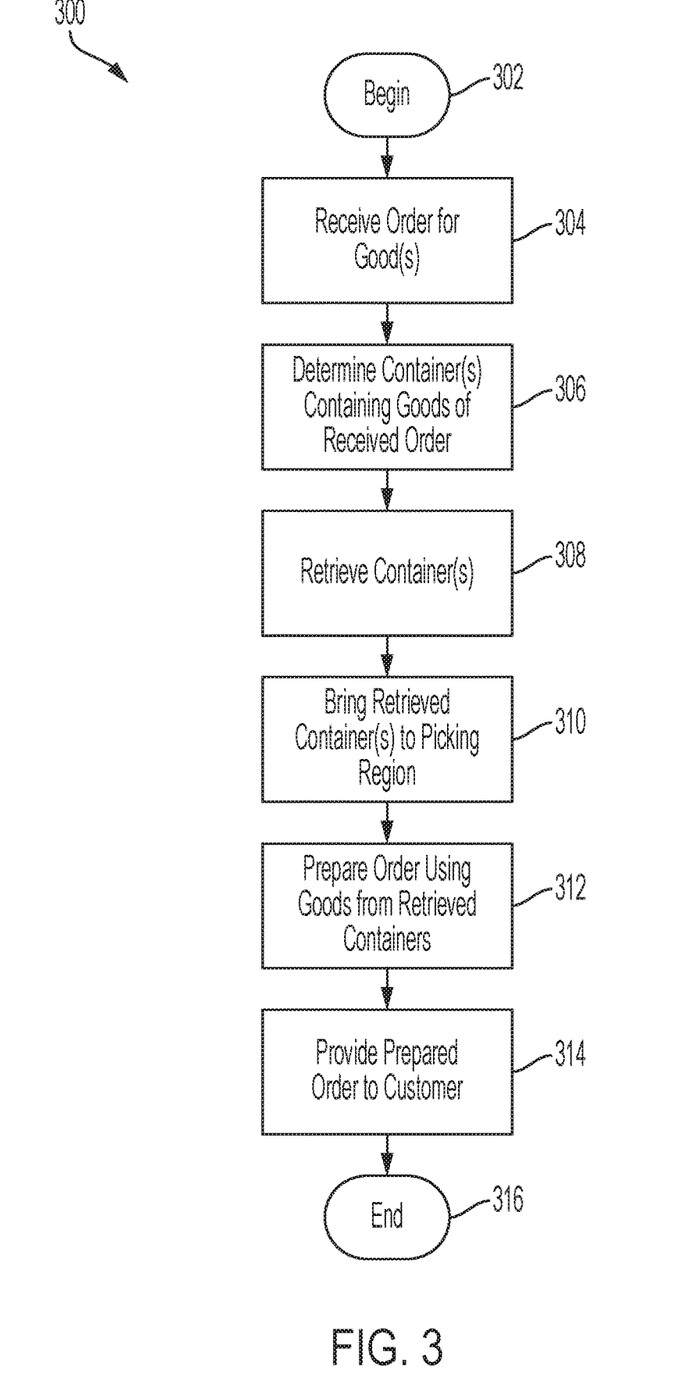
FIG. 3 illustrates a process of fulfilling an according to an example.

FIG. 3 illustrates a process 300 of operation of a storage location according to an example. The process 300 may provide an example of activity that may take place in the storage location 100, for example, or the storage location 200. The process 300 may be executed many times in succession and/or in parallel in some examples.

At act 302, the process 300 begins.

At act 304, an order for goods is received. For example, an order specifying a list of desired goods may be received from a customer, the desired goods being stored in one or more containers in the storage location 200. The customer may be a shopper in a retail or grocery store, for example, and the storage location 200 may be a retail store or grocery store, or a warehouse or fulfillment center storing goods to fulfill orders in the retail store or grocery store. The order may be prepared and transmitted electronically, and received by a computing device in, or communicatively coupled to entities in, the storage location 200. The desired goods included in the order may include combinations of goods pertaining to a wide variety of climate conditions, including goods that should be stored at a below-freezing level and goods that may be stored at a room temperature.

At act 306, a determination is made as to which container or containers contain the goods listed in the order received at act 304. For example, a computing device receiving the order may maintain or have access to a database indicating a container that one or more goods are stored in and a location of the container. The location of the container may be, for example, a specific location on a shelf of the shelving units 206. Act 306 may include determining that multiple containers must be accessed to obtain the goods at least because no single container may include all of the goods in the order.

At act 308, containers determined to contain the ordered goods are retrieved. For example, act 308 may include instructing one or more robots to travel to the location of the container and retrieve the container via a wired or wireless connection. In other examples, act 308 may include instructing one or more human workers to retrieve the container(s) in lieu of, or in addition to, instructing the robot(s) to retrieve the container(s). In either example, the robot(s) and/or human worker(s) may traverse the paths 212, which may be one- or two-directional, through the aisles 208 to a location on or in one or more of the shelving units 206 where the container(s) are stored. The container(s) may include ambient containers, climate-controlled containers, or a combination of both.

At act 310, the retrieved container(s) are brought to the picking region 204. The picking region 204 may include one or more human workers and/or robots to prepare specific customer orders using goods from the retrieved container(s). The human worker(s) and/or robot(s) that retrieved the container(s) may deposit the container(s) at the picking region 204.

At act 312, orders are prepared using goods corresponding to the order received at act 304. Preparing the orders may include extracting, by the human worker(s) and/or robot(s) at the picking region 204, goods corresponding to the received orders from the retrieved container(s).

The extracted goods may be consolidated together, such as by being placed in a separate, customer container based on the goods listed in the order. Once all of the goods corresponding to the order have been placed in the customer container, the prepared order may be provided to a customer.

At act 314, a prepared order is provided to a customer that provided the order received at act 304. For example, act 314 may include delivering a customer container containing the prepared order directly to the customer by a human worker or robot. In another example, act 314 may include placing the prepared order on a mobile surface, such as a conveyor belt, which conveys the prepared order to an area in which a customer awaits an order. The customer may then retrieve the prepared order. In still other examples, act 314 may include providing a prepared order to a customer via an intermediary, such as the customer's agent, a common carrier, and so forth.

At act 316, the process 300 ends.

As indicated above, orders for a wide variety of combinations of goods may be fulfilled in the storage location 200. The shelving units 206 may store any combination of ambient containers and climate-controlled containers, which enables the storage location 200 to flexibly adapt to changes in a distribution of goods stored in the storage location 200. Accordingly, examples of climate-controlled containers, described in greater detail below with respect to FIGS. 4 and 5A-5D, provide significant advantages to the storage location 200.

Figure 4:
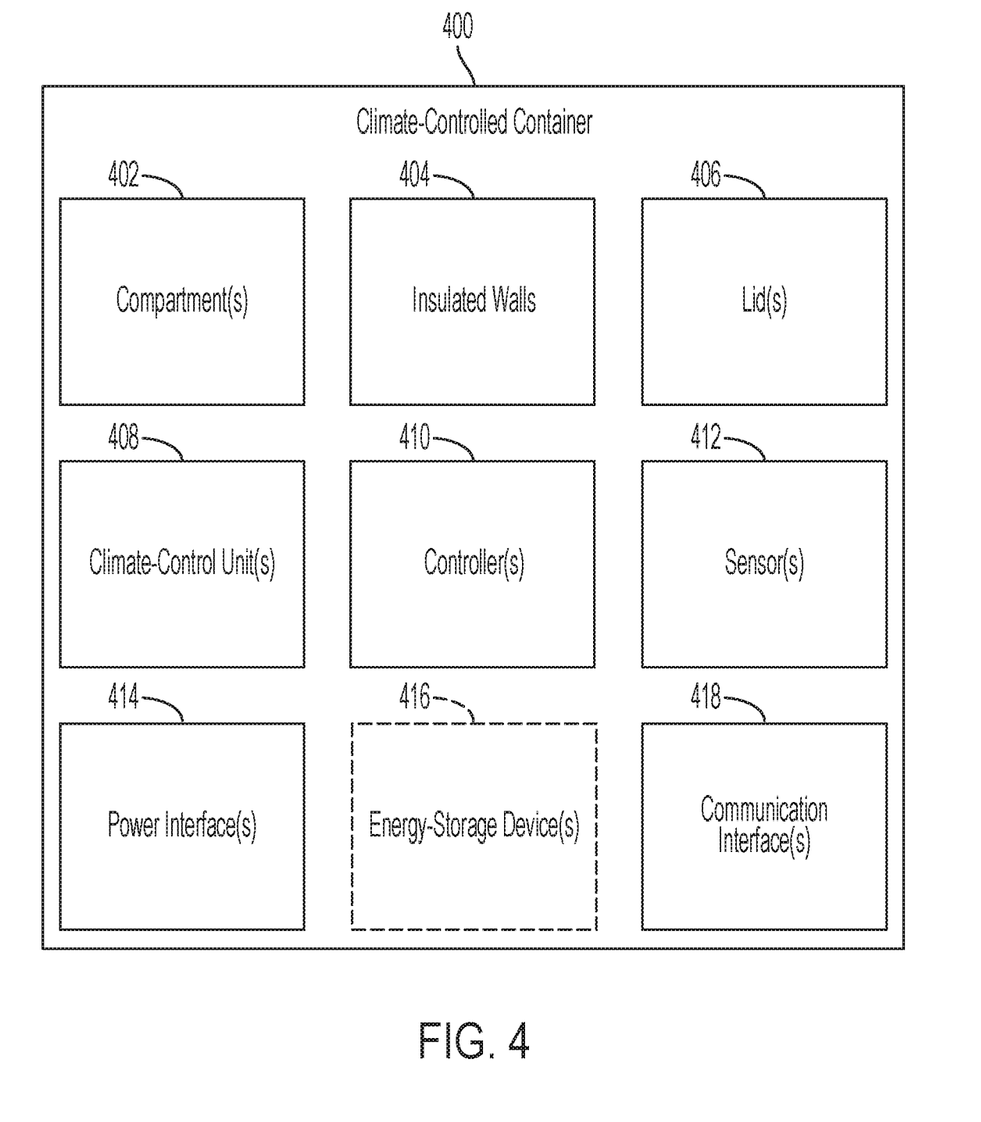
FIG. 4 illustrates a block diagram of a climate-controlled container according to an example.

FIG. 4 illustrates a block diagram of a climate-controlled container 400 according to an example. The climate-controlled container 400 (or "container 400") includes one or more compartments 402 (or "compartments 402"), insulated walls 404, one or more lids 406 (or "lids 406"), one or more climate-control units 408 (or "climate-control units 408"), one or more controllers 410 (or "controllers 410"), one or more sensors 412 (or "sensors 412"), one or more power interfaces 414 (or "power interfaces 414"), one or more energy-storage devices 416 (or "energy-storage devices 416"), and one or more communication interfaces 418 (or "communication interfaces 418").

The compartments 402 include one or more compartments, including a single compartment, in which goods can be placed. Each of the compartments 402 may have substantially any shape and size, such as a rectangular prism, which may be the same as or different than others of the compartments 402. In some examples, the compartments 402 may include multiple compartments where a depth of one of the compartments 402 differs from a depth of another one of the compartments 402. In various examples, a shape and/or size of the compartments 402 may be selected based on a size and shape of goods to be stored in the compartments 402. For example, where the container 400 is intended to store ice cream cartons, a size and shape of at least one of the compartments 402 may be configured to optimize a spatial efficiency for storing the ice cream cartons.

The insulated walls 404 include walls that enclose the compartments 402. The insulated walls 404 include at least the sides of the container 400 and the bottom of the container 400. In examples in which the compartments 402 include multiple compartments, the insulated walls 404 may include walls or dividers inside of the container 400 that divide the compartments 402. The insulated walls 404 may include, or be composed of, one or more thermally insulative materials such that an effect of an ambient environment outside of the compartments 402 does not substantially affect a climate inside of the compartments 402. In some examples, the insulated walls 404 may house all other components and aspects of the container 400. In other examples, the insulated walls 404 may house only a subset of the components and aspects of the container 400, and other components, such as the climate-control units 408, may be external to the insulated walls 404 and removably attached to the insulated walls 404. Certain components of the container 400 may be inside of at least some of the insulated walls 404. For example, certain aspects of the climate-control units 408, such as the climate-control units 408 and the power interfaces 414, may be inside of, or pass through, the insulated walls 404.

The lids 406 include one or more lids which may seal the compartments 402 from an ambient environment, and which may be removed to access goods stored in the compartments 402. In examples in which the compartments 402 include multiple compartments, the lids 406 may include a respective lid for each of the compartments 402, or may include a single lid, or may include a number of lids between one and the number of compartments 402. The lids 406 may include, or be composed of, one or more thermally insulative materials similar or identical to those of the insulated walls 404. In some examples, the lids 406 may be opened and/or closed mechanically or electromechanically. For example, the lids 406 may include a coupling point to couple to a device or component configured to open the lids 406. Such a coupling point may include a groove configured to be coupled to an automated lid-opening device, such as a robotic arm configured to mate with the groove and open the lids 406. In various examples, the lids 406 may be coupled to the insulated walls 404 via one or more hinges, and/or may be coupled to the insulated walls 404 via a friction force.

The climate-control units 408 include one or more components configured to control a climate inside of the compartments 402. For example, the climate-control units 408 may include one or more components configured to control a temperature and/or humidity inside of the compartments 402, such as one or more air conditioning units, thermal electric coolers, heat sinks, pumps, fans, plumbing through which coolant travels, and so forth. The climate-control units 408 may be adjustable based on control signals received from a controller, such as the controllers 410.

The controllers 410 include one or more controllers configured to control operation of the container 400. For example, the controllers 410 may control the climate-control units 408 to control a climate inside of the compartments 402. For example, the controllers 410 may determine a range of temperature values, which may include a range of values with fixed upper and lower temperature values or may include only a minimum or maximum value, and control the climate-control units 408 to maintain a temperature within the range of temperature values. The controllers 410 may implement hysteresis when controlling the climate-control units 408. The controllers 410 may be further configured to send, receive, and/or exchange information with one or more external devices. For example, the controllers 410 may transmit information indicative of a state of the container 400 (for example, power information, temperature and/or humidity logging information, whether the climate-control units 408 are currently operating and at what capacity, an indication of the lids 406 being left ajar, an indication of a temperature or humidity of the compartments 402 being above or below a target condition, an indication of a failure of one or more components, and so forth) and transmit the information to an external device, such as a central computing device. Similarly, the controllers 410 may receive information from an external device, such as information indicative of a temperature and/or humidity set-point that the container 400 should maintain inside the compartments 402. In various examples, the controllers 410 may receive information indicative of the range of temperature values within which to maintain a temperature of the compartments 402 and control the climate-control units 408 based on the received information. In other examples, the controllers 410 may facilitate an exchange of other types of information with an external device and/or human operators. For example, the container 400 may include one or more user or machine interfaces, which may include a display screen, a buzzer, a speaker, a light-emitting component, and so forth, to output information to a user or machine.

The sensors 412 include one or more sensors of the same or a differing type. For example, the sensors 412 may include one or more temperature sensors, one or more humidity sensors, and/or one or more additional kinds of sensors. The sensors 412 may be communicatively coupled to the controllers 410 to provide sensor information to the controllers 410. For example, the controllers 410 may receive sensor information indicative of a sensed temperature and/or humidity from the sensors 412, and control operation of the climate-control units 408 based on the received sensor information. If a sensed temperature or humidity is above a maximum temperature or humidity set point, for example, the controllers 410 may control the climate-control units 408 to reduce the temperature and/or humidity. The sensors 412 may also include additional sensors, such as position-tracking sensors (for example, accelerometers, magnetic-field sensors, and so forth), current sensors to determine a current provided to powered components of the container 400, voltage sensors to determine a voltage across powered components of the container 400, sensors to determine whether the lids 406 are open or closed (for example, infrared sensors, acoustic sensors, range sensors, and so forth), or other types of sensors, some of which may be included in one or more other components of the container 400, such as the climate-control units 408.

The power interfaces 414 include one or more power interfaces to exchange power between the container 400 and one or more external devices, components, or sources. Power received at the power interfaces 414, which may include alternating-current and/or direct-current power, may be distributed to components of the container 400, such as the climate-control units 408, the controllers 410, the sensors 412, the energy-storage devices 416, and/or the communication interfaces 418. For example, the power interfaces 414 may include an outlet to receive a corresponding plug, through which power may be provided to the containers 400 from a power source, such as the power sources 210. In another example, the power interfaces 414 may include a wireless power interface to receive power via induction or RF. In still other examples, the power interfaces 414 may include one or more electrical contacts to electrically couple to corresponding power-delivery components. For example, the power interfaces 414 may include at least two electrically conductive contacts, a first one of which may be coupled to an electrified rail (for example, an electrified rail of a shelf on which the container 400 is placed in the shelving units 206) and a second one of which may be coupled to a grounded rail (for example, a ground rail of a shelf on which the container 400 is placed in the shelving units 206). In this example, power may be delivered by a power source coupled to the electrified rail and the grounded rail, such as the power sources 210. In some examples, the power interfaces 414 may provide and/or receive power to and/or from other climate-controlled containers, which may be stacked on top of or beneath the container 400.

In some examples, the controllers 410, whether individually or in combination with the sensors 412, may sense whether power is available via the power interfaces 414. For example, the controllers 410 may determine whether a quality of the power is acceptable, such as by having a voltage level within an acceptable range of voltage values. If the controllers 410 determine that acceptable power is available, the controllers 410 may distribute power from the power interfaces 414 to other components of the container 400 including, for example, the climate-control units 408, the controllers 410, the sensors 412, the energy-storage devices 416, and the communication interfaces 418. If the controllers 410 determine that acceptable power is not available, then the controllers 410 may control the energy-storage devices 416, if included, to distribute power to components of the container 400 including, for example, the climate-control units 408, the controllers 410, the sensors 412, and the communication interfaces 418. The controllers 410 may monitor the power interfaces 414 to determine when power is again available, if ever, and resume providing power to components of the container 400 from the power interfaces 414 if power again becomes available.

The energy-storage devices 416 may optionally be included, and may include one or more devices or components configured to store electrical energy. For example, the energy-storage devices 416 may include one or more batteries, capacitors, flywheels, and so forth. The energy-storage devices 416 may be rechargeable and may include one or more chargers. For example, the energy-storage devices 416 may be rechargeable using power received at the power interfaces 414. In some examples, the energy-storage devices 416 may be removable or external to the container 400.

The communication interfaces 418 include one or more interfaces that enable communicative connection with an external device. For example, the communication interfaces 418 may include a wired communication interface (for example, a physical communication port) and/or a wireless communication interface (for example, an antenna). The communication interfaces 418 may enable communication between the controllers 410 and one or more external devices, such as a central computing device configured to exchange information with the container 400. For example, the controllers 410 may send information indicative of operation of the container 400 to an external device via the communication interfaces 418 and/or receive information indicative of control instructions or information from the external device via the communication interfaces 418. Control information may include, for example, information indicative of a desired temperature set point for the container 400 to provide. In various examples, the communication interfaces 418 may include one or more user interfaces to output information directly to a user, such as one or more display screens, buzzers, speakers, light-emitting components, and so forth, to output information to a user or machine.

An example of the container 400 is provided with respect to FIGS. 5A-5D for purposes of example only. The container may be embodied in a different manner than that shown in FIGS. 5A-5D. Accordingly, it is to be appreciated that the examples provided in connection with FIGS. 5A-5D are non-limiting with respect to the container 400.

Figure 5A:
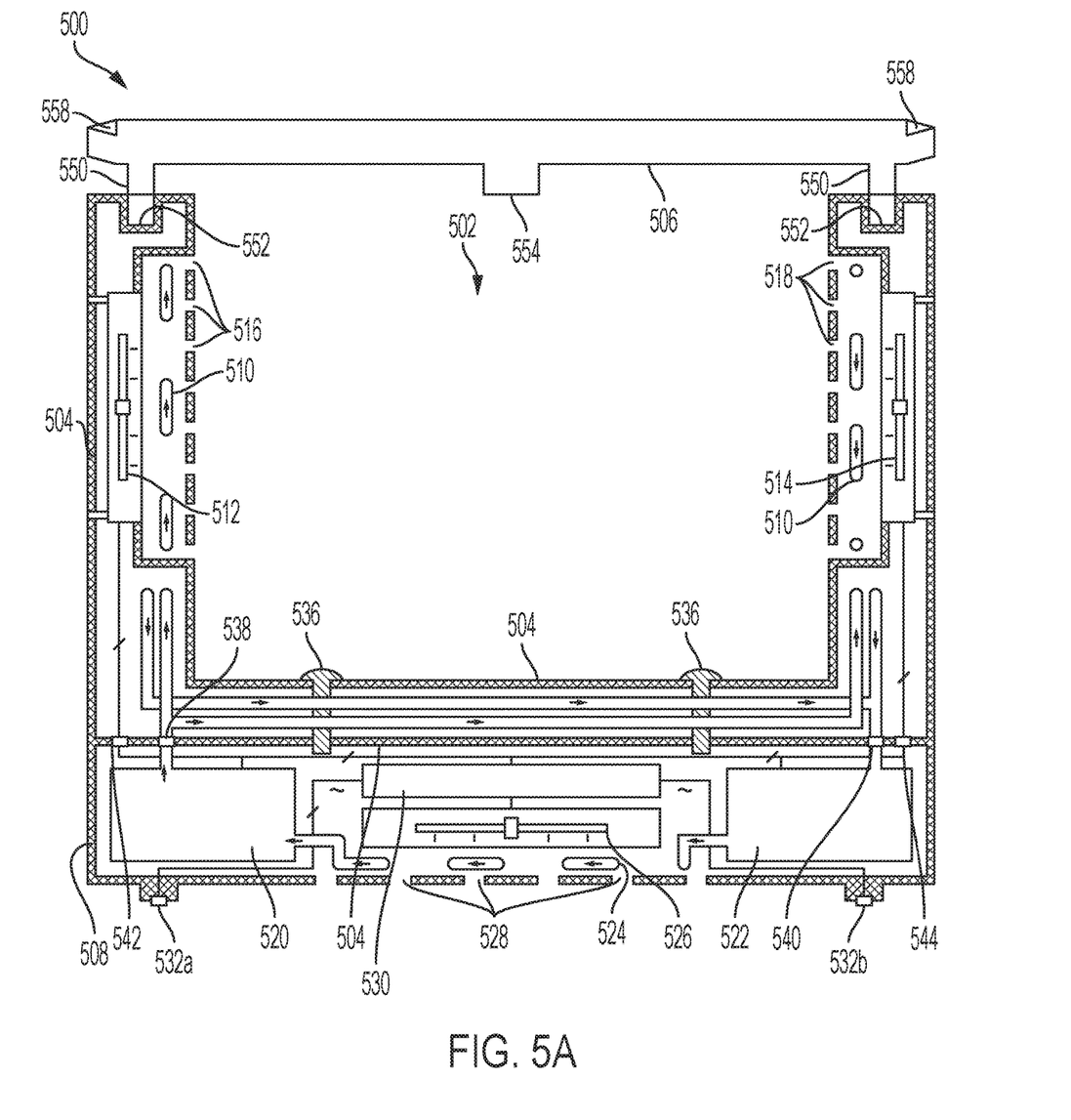
FIG. 5A illustrates a front cross-section view of a climate-controlled container according to an example.
Figure 5B:
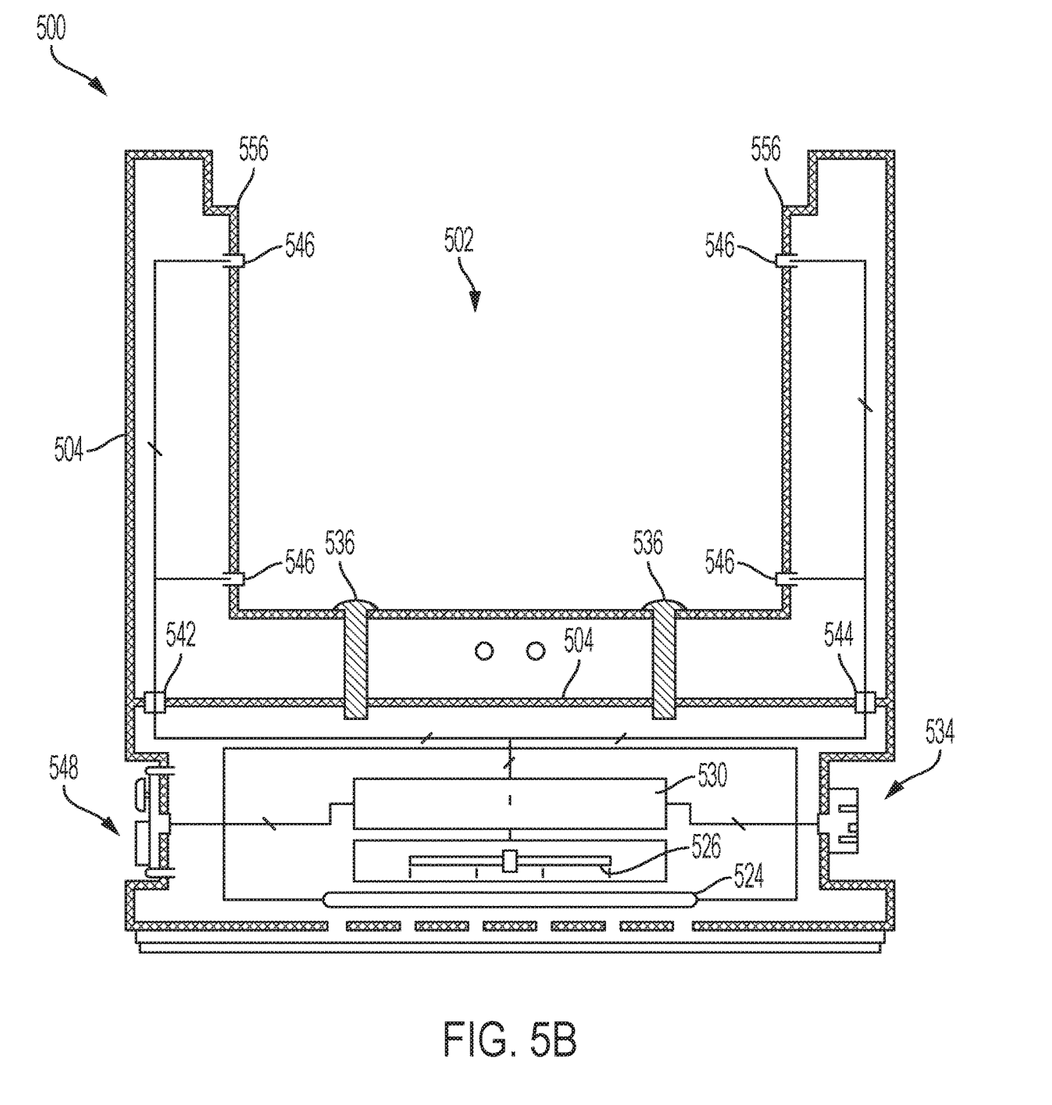
FIG. 5B illustrates a side cross-section view of the climate-controlled container of FIG. 5A according to an example.
Figure 5C:
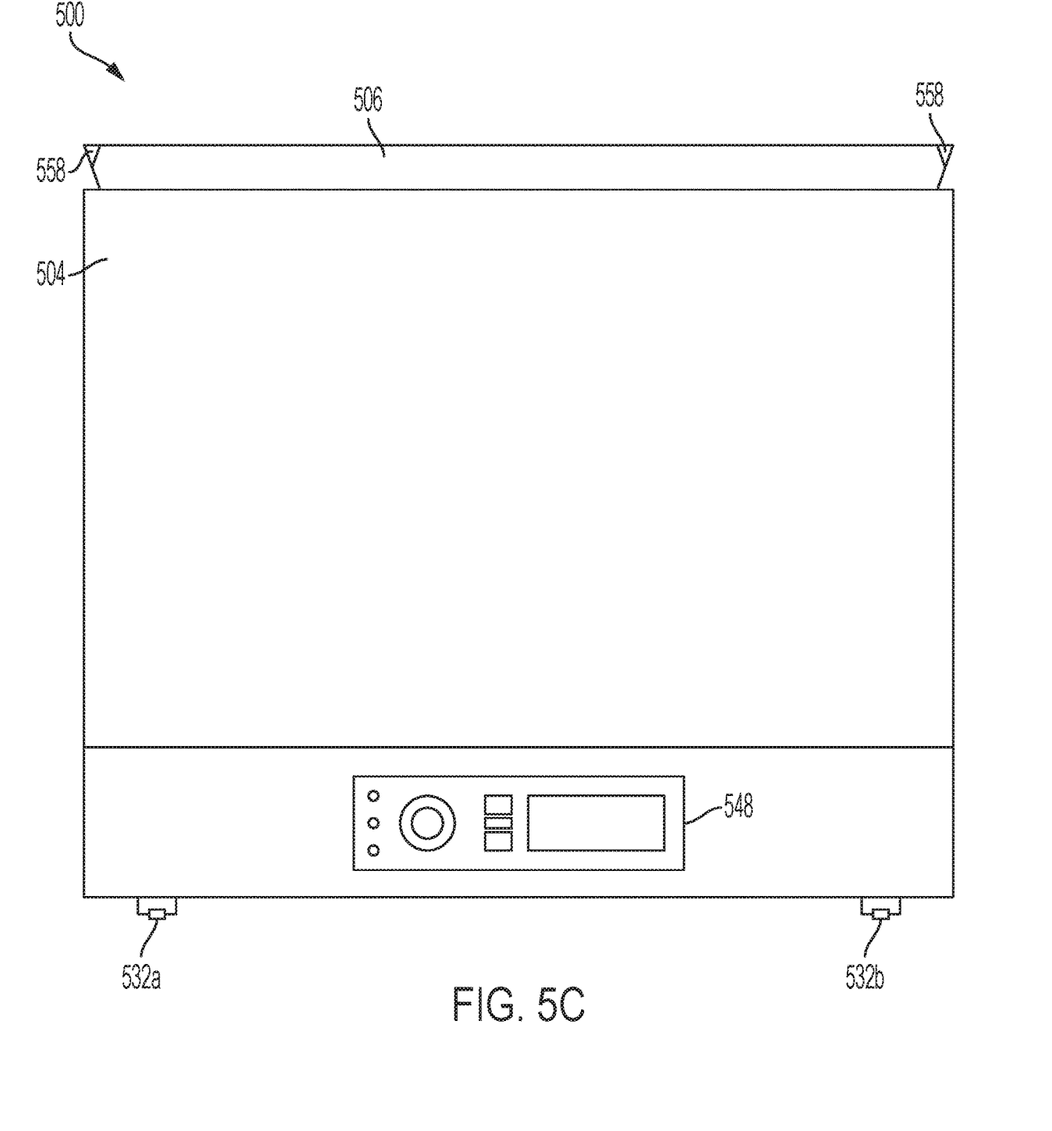
FIG. 5C illustrates a front view of the climate-controlled container of FIGS. 5A and 5B according to an example.
Figure 5D:
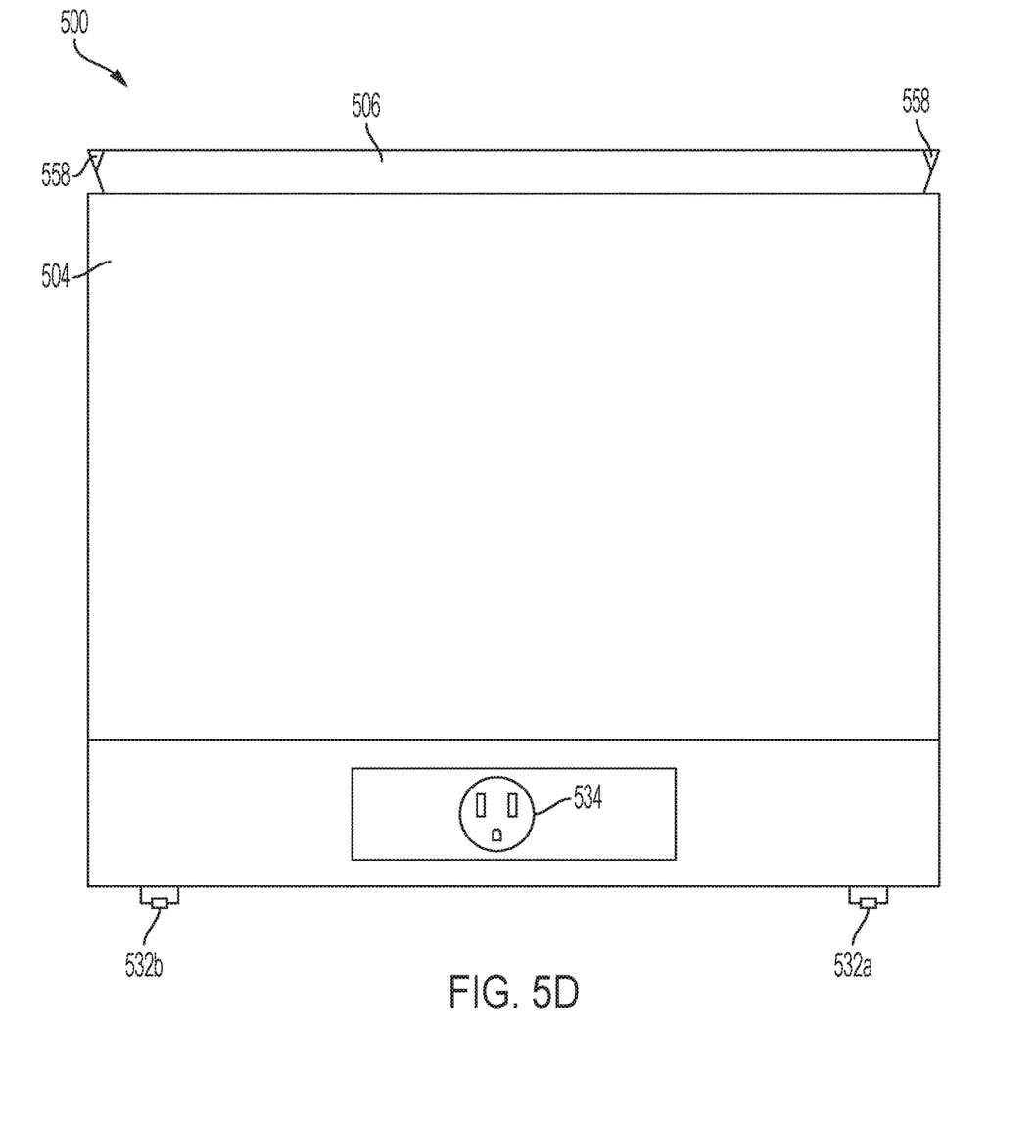
FIG. 5D illustrates a back view of the climate-controlled container of FIGS. 5A-5C according to an example.

FIG. 5A illustrates a front cross-section view of a climate-controlled container 500 (or "container 500") according to an example. FIG. 5B illustrates a side cross-section view of the container 500 according to an example. FIG. 5C illustrates a front view of the container 500 according to an example. FIG. 5D illustrates a back view of the container 500 according to an example. The container 500 may include an example of the container 400.

The container 500 includes a compartment 502 encapsulated by walls 504 on five sides, including a bottom side, and a lid 506 on a sixth side. The compartment 502, the walls 504, and the lid 506 may include an example of the compartments 402, the insulated walls 404, and the lids 406, respectively. The container 500 further includes a climate-control unit 508 configured to provide climate control to the container 500 and, in particular, to goods stored in the compartment 502. The climate-control unit 508 may be removably attached to the walls 504. In various examples, the climate-control unit 508 drives coolant through plumbing 510 in the container 500 (for example, within the walls 504). The container 500 includes a first fan 512 and a second fan 514, each of which is configured to drive air flow across portions of the plumbing 510 into the compartment 502. The fans 512, 514 may pass through the walls 504 such that air is drawn from outside of the container 500 and driven across and around the plumbing 510. The plumbing 510 may be cooled by coolant flowing therethrough such that air driven across the plumbing 510 is cooled. The walls 504 may include a first set of openings 516 located between the first fan 512 and the compartment 502, and/or a second set of openings 518 located between the second fan 514 and the compartment 502, such that air (for example, cooled air) may be driven into the compartment 502.

The climate-control unit 508 includes a condenser 520 and a compressor 522. The condenser 520 is configured to receive coolant from the compressor 522 via plumbing 524, condense the coolant, and output the condensed coolant to other components of the container 500 via the plumbing 510. The compressor 522 is configured to receive coolant from the plumbing 510 after the coolant has been driven by the condenser 520 through the plumbing 510, compress the coolant, and provide the compressed coolant to the condenser 520 via the plumbing 524. As the compressed coolant passes through the plumbing 524, a third fan 526 is configured to drive air flow across the plumbing 524 through openings 528 in a base of the climate-control unit 508. In so doing, a temperature of the plumbing 524, coolant therein, and/or air surrounding the plumbing 524 may be lowered.

The climate-control unit 508 further includes an electrical system 530. The electrical system 530 may include one or more controllers, power converters, energy-storage devices, energy-storage-device chargers, sensors, communication interfaces (including, for example, user interfaces and wireless communication interfaces), memory, storage, and so forth. The electrical system 530 may be responsible for delivering power to, and controlling operation of, components in the container 500. For example, the electrical system 530 may distribute power to, and send, receive, or exchange information with, the condenser 520, the compressor 522, the fans 512, 514, 526, sensors in the container 500, and/or other components of the container 500. Sending, receiving, and/or exchanging information with a component may include providing control signals to the component (for example, instructing the component to turn on, turn off, change a mode of operation, change a parameter set point, and so forth) and/or requesting, polling, or receiving information from the component (for example, requesting, sensing, or polling information indicative of a mode of operation, operation parameters, present and/or past sensed values, and so forth). The electrical system 530 may include a wired or wireless communication interface through which the electrical system 530 sends and/or receives information with an external entity, such as a centralized control system. For example, the electrical system 530 may receive control information from the centralized control system indicative of a temperature set point at which to maintain the container 500, and/or may send operational information indicative of operation of, and/or a state of, the container 500 or components thereof to the centralized control system.

The electrical system 530 is configured to receive electrical power via contacts 532, as illustrated in FIG. 5A, and/or via a power outlet 534, as illustrated in FIGS. 5B and 5D. The contacts 532 include a first contact 532a and a second contact 532b, each of which may be coupled to an electrically conductive rail. For example, where the container 500 is placed on shelving, such as shelving of the shelving units 206, one of the contacts 532 may be placed on an electrified or powered rail through which current is supplied from a power source (for example, one of the power sources 210) to the container 500, and a second one of the contacts 532 may be placed on a return or ground rail through which current is returned to the power source from the container 500. In another example, such as an example in which the container 500 is configured to be retrieved by a retrieval robot, the container 500 may receive electrical power from the robot via the contacts 532. Power may alternately or additionally be provided from a power source to the container 500 via the power outlet 534. For example, a power source may include a plug configured to establish an electrical connection with the power outlet 534, and power may be provided to the container 500 via the electrical connection. The power source may include, for example, the power source 210, or a retrieval robot. In various examples, the contacts 532 may be placed on a bottom portion of the container 500, that is, a portion of the container 500 that physically contacts a surface on which the container 500 rests, such as a shelf of the shelving units 206.

As discussed above, the climate-control unit 508 may be removably attached to other components of the container 500, including the walls 504. For example, the climate-control unit 508 may be removably coupled to other components of the container 500, including the walls 504, via fasteners 536. The fasteners 536 may establish and/or maintain an interface between the climate-control unit 508 and the walls 504 (that is, a point at which or area across which the climate-control unit 508 and the walls 504 are in physical proximity or connection), which may include one or more connections across which mass and/or energy can be transferred. For example, the condenser 520 provides coolant through the plumbing 510 in the container 500 via an input coolant connection 538. As the coolant passes through the plumbing 510 back to the compressor 522, the coolant enters the climate-control unit 508 through an output coolant connection 540. The coolant is then received and compressed by the compressor 522 as discussed above.

As discussed above, the electrical system 530 may be configured to provide electrical power to, and send, receive, or exchange information with, components of the container 500 that may not be within the climate-control unit 508. For example, the electrical system 530 may provide electrical power to the first fan 512, the second fan 514, and/or other components of the container 500 described in greater detail below, including sensors. Power may be provided from the climate-control unit 508 to other components of the container 500, and information may be sent, received, or exchanged with other components of the container 500, via a first electrical connection 542 and/or a second electrical connection 544. One or more current signals may be output by the electrical system 530 via a first of the connections 542, 544 and returned to the electrical system 530 via a second of the connections 542, 544.

As discussed above, the container 500 may include one or more sensors. As illustrated in FIG. 5B, the container 500 may include sensors 546 disposed throughout the container 500. The sensors 546 may include one or more types of sensors, such as temperature sensors, humidity sensors, light sensors, and so forth. In some examples, the container 500 may include additional or fewer sensors than those illustrated in FIG. 5B, and sensors may be positioned differently than in the configuration illustrated in FIG. 5B. The sensors 546 may receive power and/or information from the electrical system 530, and may send information to the electrical system 530. For example, the sensors 546 may receive power and a request for sensor information or data from the electrical system 530, and the sensors 546 may provide sensor information or data to the electrical system 530. Sensor information or data may include information indicative of one or more sensed values of an environmental parameter, such as a temperature measurement, a humidity measurement, and so forth. As discussed above, the container 500 may further include other types of sensors, such as sensors that provide information indicative of a physical or geographic location of the container 500, which may be included in the climate-control unit 508 or other components of the container 500.

The container 500 further includes a user interface 548, as illustrated in FIGS. 5B and 5C. The user interface 548 may include one or more user inputs and one or more user outputs. User inputs may include buttons, switches, touch-sensitive displays, dials, and so forth. User outputs may include light-emitting components, display screens, buzzers, speakers, and so forth. Users may interact with the container 500 via the user interface 548. For example, the user interface 548 may display information indicative of operating conditions of the container 500 (for example, a capacity for additional goods, a power consumption, an input power, current, or voltage, a temperature, a remaining battery life, a remaining battery runtime, any error conditions, a state of the lid 506, such as open or closed, or other operating conditions) and/or information indicative of identifying characteristics of the container 500 (for example, where the container 500 is or should be stored, an indication that the container 500 contains goods corresponding to an outstanding order, an identification number of the container 500, what type of goods the container 500 contains or is intended to contain, and so forth). The user interface 548 may receive information indicative of desired operating conditions of the container 500 (for example, climate set point conditions) and/or information indicative of identifying characteristics of the container 500 (for example, where the container 500 is or should be stored, an identification number of the container 500, what type of goods the container 500 contains or is intended to contain, and so forth).

As discussed above, the lid 506 is removably coupled to the walls 504 such that goods may be added or removed from the compartment 502. The lid 506 includes protrusions 550 towards both sides of the lid 506 configured to mate with openings 552 in both sides of the walls 504, as illustrated in FIG. 5A. The protrusions 550 mate with the openings 552 to ensure a suitable coupling between the lid 506 and the walls 504. In some examples, the container 500 may include one or more sensors configured to detect whether the protrusions 550 are currently properly mated with the openings 552, such as by the protrusions 550 being inserted sufficiently far into the openings 552. The lid 506 further includes a central protrusion 554 along a middle of the lid 506, as illustrated in FIG. 5A, configured to mate with guides 556 on a front and back wall of the walls 504, as illustrated in FIG. 5B, to facilitate opening and/or closing of the lid 506 without fully removing the lid 506.

The lid 506 includes grooves 558 to facilitate opening, closing, removing, and/or inserting the lid 506. The grooves 558 may be angled and/or contoured. A human user may be capable of inserting her fingers into the grooves 558 to more easily handle the lid 506. Similarly, a robot or machine may be configured to remove the lid 506 from the container 500, and the grooves 558 may provide a means of mating between a protrusion or other component of the robot or machine and the lid 506. A dimensionality and/or material of the lid 506 may be selected such that, when the lid 506 is coupled with the walls 504, the compartment 502 is sealed from an ambient environment. The seal may be partial in some examples, at least because air flow through the compartment 502 may be desirable to output heat exhaust, draw air across the plumbing 510, and so forth. In other examples, the seal created by the lid 506 may render the compartment 502 entirely airtight.

In various examples, the container 500 may include additional, fewer, or different components. For example, the container 500 may include multiple compartments of the same or varying dimensions. Each compartment may be separated by one or more walls, which may be insulated and removable. The container 500 may further include multiple climate-control units. For example, the container 500 may include multiple climate-control units, each of which controls a climate of a respective one of multiple compartments. Each compartment may further include multiple sensors to provide sensed information to an electrical system, which may be shared by components corresponding to each individual compartment. Furthermore, components of the container 500 may be positioned and/or oriented differently than the positions and orientations illustrated in connection with the container 500.

For example, although in some examples the power interfaces 414 may include electrically conductive contacts and/or a power outlet (for example, similar to the contacts 532 and the power outlet 534), in some examples, the power interfaces 414 may alternately or additionally include wireless power interfaces, such as an induction power interface, a radio-frequency power interface, and so forth. For example, in the context of the container 500, the electrical system 530 may include, or be coupled to, a wireless power interface, which may include an induction power interface and/or a radio-frequency power interface. As discussed above, the power interfaces 414 may receive power from a power source such as the power sources 210, and may further include a power source provided by a retrieval robot.

Furthermore, while some examples of the climate-control units 408 may employ vapor-compression refrigeration (for example, through implementation of a condenser and compressor, such as the condenser 520 and the compressor 522), in some examples the climate-control units 408 may include one or more thermoelectric coolers in addition to, or in lieu of, one or more vapor-compression-refrigeration-based climate-control units. In still other examples, other components may be implemented to control a climate of the container 400.

As discussed above, the climate-control unit 508 may be removably coupled to other components of the container 500, such as the walls 504, via the fasteners 536. In some examples, the fasteners 536 may include screws. In other examples, a climate-control unit, such as the climate-control units 408, may be coupled to other components of a container, such as the container 400, via one or more other types of fasteners in addition to or in lieu of screws, such as snaps, clamps, interlocking joints, hook-and-loop, magnets, nails, bolts, adhesive, and so forth.

Although in some examples the lids 406 may be on a top of the container 400, in other examples the lids 406 may be coupled to the container 400 at points in addition to, or in lieu of, a top of the container 400. For example, one or more of the lids 406 may be removable from a front, back, or side of the container 400. The lids 406 may be coupled to the insulated walls 404 via substantially any removable connection, including via hinges, where the lids 406 are rotatable about the hinges and thus remain in physical connection with other components of the container 400 but which allow goods to be inserted into or removed from the compartments 402 when rotated into an opened position.

As discussed above, the compartments 402 may be chilled to substantially any desired temperature range. For example, when storing certain goods, such as ice cream, the climate-control units 408 may maintain a temperature of at least one of the compartments 402 at approximately −40° F. The climate-control units 408 may maintain a temperature of another one of the compartments 402 at another value, such as a temperature above a freezing point. Furthermore, at least some of the compartments 402 may not be refrigerated and may instead remain at an ambient temperature, regardless of whether or not other compartments of the compartments 402 are refrigerated.

In some examples, the container 400 may be configured to be stacked with other containers, which may or may not be climate-controlled containers. The insulated walls 404 and/or lids 406 may include one or more fasteners configured to facilitate a physical connection with other containers. For example, the lids 406 may include one or more protrusions or depressions and the insulated walls 404 may include, on a bottom portion of the container 400, one or more corresponding depressions or protrusions to mate with those of the lids 406. In other examples, other corresponding fasteners may be employed to facilitate a physical connection between containers. In still other examples, no fasteners may be employed to facilitate stacking the container 400 with other containers.

In various examples, the container 400 may be configured to provide power to, or receive power from, one or more stacked containers. The power interfaces 414 may include one or more input power interfaces to receive power from a stacked container or other power source, and may further include one or more output power interfaces to provide power to a stacked container. For example, the lids 406 may include one or more power interfaces of the power interfaces 414 to provide output power to a container stacked on top of the container 400, and may include one or more power interfaces of the power interfaces 414 to receive input power from a container on which the container 400 is stacked, or another power source, such as a powered rail, a power plug coupled to a power outlet of the container 400, and so forth. In this manner, a bottom-most container in a stack of containers may receive power from a power source, such as one of the power sources 210, and provide a portion of the received power to a second container stacked on top of the bottom-most container. The second container may receive the power and provide a portion of the power to a third container stacked on top of the second container, and so forth, such that an arbitrary number of containers may be stacked on top of one another and powered by a power source via each intervening container beneath a stacked container.

In some examples, the power interfaces 414 may include power interfaces to provide output power to containers positioned on other sides of the container 400 rather than, or in addition to, containers stacked on top of the container 400. For example, the power interfaces 414 may be positioned on the sides, front, and/or back of the container 400, and the container 400 may provide electrical power derived from a power source to containers electrically coupled to the power interfaces 414. In some examples, the container 400 may provide electrical power to containers electrically coupled to the power interfaces 414 regardless of whether or not power is available to the container from an external power source. For example, the container 400 may provide electrical power derived from energy stored in the energy-storage devices 416.

Although examples are provided in which the container 400 may be implemented in connection with storage, for example, storage on shelving units 206, the containers 400 may be implemented in additional conditions. For example, the container 400 may be used in connection with an order-staging area, such as the picking region 204, such that goods in a staging, waiting, or picking area may remain in a climate-controlled environment before being removed and placed into, for example, a customer container for delivery to a customer. Moreover, in examples in which the container 400 is stackable, stacking containers ensures that space in these staging, waiting, or picking areas can be used efficiently. The container 400 may also be implemented in areas other than traditional storage locations, such as delivery vehicles or pickup lockers. In each of these examples, the container 400 may receive electrical power from a power source, such as a power source in an order-staging area (which may, for example, be coupled to a shelving unit upon which the container 400 is placed and from which the container 400 receives power), a power source in a delivery vehicle (which may, for example, be coupled to a shelving unit in the delivery vehicle upon which the container 400 is placed and from which the container 400 receives power), or a power source in a pickup locker (which may, for example, be coupled to a shelving unit in the pickup locker in which the container 400 is placed and from which the container 400 receives power). It is to be appreciated that the container 400 may further be implemented in other examples, such as in connection with shelving units disposed in locations not specifically identified above, and may receive power from power sources other than those identified above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A climate-controlled container configured to be transported by a robot, the climate-controlled container comprising:
 a plurality of walls defining a compartment to store goods;
 a lid configured to seal the compartment;
 at least one climate-control unit configured to control a climate inside the compartment;
 a controller configured to control the at least one climate-control unit to maintain a temperature of the compartment within a range of temperature values; and
 a power interface configured to receive electrical power from at least one shelving unit to which the climate-controlled container is coupled, the power interface including a plurality of contacts,
 wherein the climate-controlled container is a first climate-controlled container, and wherein the first climate-controlled container is configured to be placed in contact with a second climate-controlled container, wherein the plurality of electrical contacts is configured to be electrically coupled to the second climate-controlled container, and wherein the first climate-controlled container is configured to receive, via the plurality of electrical contacts, power from the second climate-controlled container.

2. The climate-controlled container of claim 1, further comprising a communication interface communicatively coupled to the controller.

3. The climate-controlled container of claim 2, wherein the controller is further configured to receive, from an external computing device via the communication interface, instructions to maintain the temperature of the compartment within the range of temperature values.

4. The climate-controlled container of claim 2, wherein the controller is further configured to send, to an external computing device via the communication interface, information indicative of operating conditions of the first climate-controlled container.

5. The climate-controlled container of claim 4, wherein the information indicative of the operating conditions includes temperature information indicative of at least one of the temperature or humidity of the compartment.

6. The climate-controlled container of claim 4, wherein the information indicative of the operating conditions includes information indicative of a location of the first climate-controlled container.

7. The climate-controlled container of claim 4, wherein the information indicative of the operating conditions includes information indicative of whether the lid is opened or closed.

8. The climate-controlled container of claim 1, wherein the plurality of electrical contacts is disposed on a bottom portion of the first climate-controlled container.

9. The climate-controlled container of claim 8, wherein the bottom portion of the first climate-controlled container is configured to be placed on a shelving unit including a powered rail, and wherein at least one electrical contact of the plurality of electrical contacts is configured to receive power from the powered rail.

10. The climate-controlled container of claim 8, wherein the bottom portion of the first climate-controlled container is configured to be placed on a transportation robot, and wherein at least one electrical contact of the plurality of electrical contacts is configured to receive power from the transportation robot.

11. The climate-controlled container of claim 8, wherein the plurality of electrical contacts is a first plurality of electrical contacts, and wherein the first climate-controlled container further comprises a second plurality of electrical contacts electrically coupled to the first plurality of electrical contacts.

12. The climate-controlled container of claim 11, wherein the first climate-controlled container is configured to be in contact with a third climate-controlled container, wherein the second plurality of electrical contacts is configured to be electrically coupled to the third climate-controlled container, and wherein the first climate-controlled container is configured to provide, via the second plurality of electrical contacts, power to the third climate-controlled container.

13. The climate-controlled container of claim 1, wherein the compartment is a first compartment, and wherein the first climate-controlled container includes a second compartment to store goods, the second compartment being separated from the first compartment by a wall.

14. The climate-controlled container of claim 13, wherein the controller is configured to control the at least one climate-control unit to maintain the first compartment within a first range of temperature values and to maintain the second compartment within a second range of temperature values, the first range of temperature values being different than the second range of temperature values.

* * * * *